(12) United States Patent
Watry

(10) Patent No.: US 9,833,725 B2
(45) Date of Patent: Dec. 5, 2017

(54) INTERACTIVE CLOUD-BASED TOY

(71) Applicant: Krissa Watry, Folly Beach, SC (US)

(72) Inventor: Krissa Watry, Folly Beach, SC (US)

(73) Assignee: Dynepic, Inc., Charleston, SC (US)

(*) Notice: Subject to any disclaimer, the term of this patent is extended or adjusted under 35 U.S.C. 154(b) by 0 days.

(21) Appl. No.: 14/739,297

(22) Filed: Jun. 15, 2015

(65) Prior Publication Data
US 2015/0360139 A1 Dec. 17, 2015

Related U.S. Application Data

(60) Provisional application No. 62/012,603, filed on Jun. 16, 2014.

(51) Int. Cl.
A63H 33/26 (2006.01)
H04L 29/08 (2006.01)

(52) U.S. Cl.
CPC ............. *A63H 33/26* (2013.01); *H04L 67/12* (2013.01); *H04L 67/306* (2013.01)

(58) Field of Classification Search
None
See application file for complete search history.

(56) References Cited

U.S. PATENT DOCUMENTS

| 6,290,565 B1* | 9/2001 | Galyean, III | A63H 3/16 273/148 B |
| 6,368,177 B1* | 4/2002 | Gabai | A63F 13/12 446/298 |
| 6,729,884 B1* | 5/2004 | Kelton | G09B 23/28 434/236 |
| 6,773,344 B1* | 8/2004 | Gabai | A63H 3/28 463/1 |
| 8,425,273 B2 | 4/2013 | Atsom et al. | |
| 8,647,202 B2* | 2/2014 | Crevin | A63F 13/04 446/141 |
| 8,894,462 B2* | 11/2014 | Leyland | A63F 13/02 446/175 |

(Continued)

FOREIGN PATENT DOCUMENTS

| CN | 203520112 | 4/2014 |
| WO | WO2013192348 | 12/2013 |
| WO | WO2014060731 | 4/2014 |

OTHER PUBLICATIONS

PCT International Search Report and Written Opinion, dated Sep. 1, 2015.

*Primary Examiner* — Tramar Harper
(74) *Attorney, Agent, or Firm* — Gregory Finch; Finch Paolino, LLC

(57) ABSTRACT

An interactive cloud-based toy for children having a communicator located in the housing of the toy is provided. The communicator has electronic circuitry operatively coupled to a cloud database for transmitting and receiving data through a Bluetooth connection with a smart device. The cloud database corroborates and aggregates data across toys, third party cloud services, and provides customized content to the communicator. The cloud database is operatively connected to the electronic circuitry and is capable of receiving commands therefrom and transmitting data thereto. The cloud database includes provision for authorization of the user and a sensor group.

17 Claims, 8 Drawing Sheets

(56) References Cited

U.S. PATENT DOCUMENTS

| | | | |
|---|---|---|---|
| 2002/0049806 A1* | 4/2002 | Gatz | G06F 21/62 709/203 |
| 2002/0059153 A1* | 5/2002 | Dan | G06N 3/008 706/25 |
| 2002/0103862 A1* | 8/2002 | Burr | H04L 63/083 709/204 |
| 2003/0059757 A1 | 3/2003 | Wood | |
| 2004/0067713 A1 | 4/2004 | Fong | |
| 2006/0234602 A1* | 10/2006 | Palmquist | A63H 3/003 446/297 |
| 2006/0273909 A1* | 12/2006 | Heiman | A63H 33/00 340/572.7 |
| 2007/0097832 A1* | 5/2007 | Koivisto | A63F 3/08 369/63 |
| 2008/0005325 A1* | 1/2008 | Wynn | G06Q 10/107 709/225 |
| 2008/0014833 A1* | 1/2008 | Bozzone | A63H 30/00 446/454 |
| 2008/0026666 A1* | 1/2008 | Ganz | G06Q 30/0222 446/175 |
| 2008/0160877 A1* | 7/2008 | Lipman | A63H 3/28 446/268 |
| 2010/0041304 A1 | 2/2010 | Eisenson | |
| 2011/0028219 A1 | 2/2011 | Heatherly et al. | |
| 2011/0053455 A1* | 3/2011 | Jang | A63H 3/28 446/397 |
| 2012/0190453 A1* | 7/2012 | Skaff | A63H 3/28 463/41 |
| 2013/0022232 A1* | 1/2013 | Jacob | G06K 9/00 382/103 |
| 2014/0038489 A1 | 2/2014 | Sharma et al. | |
| 2014/0178847 A1* | 6/2014 | Akavia | A63H 33/042 434/308 |
| 2014/0358986 A1* | 12/2014 | Min | H04L 67/38 709/202 |
| 2015/0031268 A1* | 1/2015 | Waites | A63H 30/04 446/454 |
| 2015/0065258 A1* | 3/2015 | Meade | A63F 13/235 463/43 |
| 2015/0099419 A1* | 4/2015 | Kaiser | A63H 33/3016 446/482 |
| 2015/0133025 A1* | 5/2015 | Ponomarev | A63H 3/28 446/484 |
| 2015/0140896 A1* | 5/2015 | Maiti | A63H 33/26 446/484 |
| 2015/0251102 A1* | 9/2015 | Kuo | A63F 13/215 463/35 |
| 2015/0290548 A1* | 10/2015 | Meyers | A63H 3/28 446/397 |

* cited by examiner

INTERACTIVE CLOUD-BASED TOY

CROSS-REFERENCE TO RELATED APPLICATIONS

The contents of Provisional Application U.S. Ser. No. 62/012,603 filed Jun. 16, 2014, on which the present application is based and benefits claimed under 35 U.S.C. §119(e), is herein incorporated by reference.

BACKGROUND OF THE INVENTION

1. Field of the Invention

This invention relates to an electronic, interactive cloud-based toy system for children. More particularly, the present invention is to an interactive toy that can respond to physical stimuli and communicate with other toys, smart devices, and the interne to update its behavior over time.

2. The Prior Art

While there have been toys that change personalities based upon how they were played with by the child, the toy's behavior was based on pre-loaded programs. In other toys, these programs could be changed slightly by a child's interaction on a smart device (such as a phone, tablet or computer) that was operatively connected to the toy. Other smart toys have been reported that use cloud databases to speak to a child using conversation engines in the cloud that learn about the child over time and prompt conversation based upon the child's responses. These smart toys can talk about seemingly relevant information for the child but they are not completely dynamic since they use pre-recorded audio files and are only as dynamic as the recorded files allow.

SUMMARY OF THE INVENTION

It is the general object of the present invention to create an easy to use dynamic, polymorphic toy exhibiting pre-loaded, updated, connected or disconnected behaviors impacting the primary toy's (personality/features/game play), subsequent toys, and the child or children's course of play.

Intercommunication is the toy's cornerstone. This means that not only can smart devices (phones, tablets, computer and the like) interface with the toy, but the toy can communicate with other cloud connected toys from anywhere as long as there is wireless connection. The interactive cloud-based toy has a communicator located in the housing of the toy. The communicator has electronic circuitry operatively coupled to a cloud database for transmitting and receiving data through a Bluetooth connection with a smart device that then talks to the internet based cloud via a WiFi connection. Or in another embodiment, the communicator can talk direct to the cloud database via WiFi. The cloud database corroborates and aggregates data across toys, third party cloud services, and provides customized content based on a user profile to the communicator. The electronic circuitry provides power to a microprocessor having memory capability. The cloud database is operatively connected to the electronic circuitry and is capable of receiving commands therefrom and transmitting data thereto. The cloud database includes provision for authorization of the user and the associated sensor group. Other communication protocol and frequencies can be used, depending upon network availability and toy features allowing toys to communicate locally amongst the toys, to exchange data between the toys and the cloud service and variations thereof.

The interactive toy uses location of the toy (taken from the toy or a the connected smart device, or other connected device with location sensing), time, and/or interests of the child to generate custom content to enhance existing play patterns, personalize play content, and present an interactive and entertaining experience for children age birth to twelve where special privacy, parental permissions, and security must be maintained.

Other objects features and advantages of the invention will be apparent to those skilled in the art from the following detailed description taken in conjunction with the drawings.

BRIEF DESCRIPTION OF THE DRAWINGS

Having described the invention in general terms, reference will now be made to the accompanying drawings, which are not necessarily drawn to scale, wherein.

DESCRIPTION OF THE PREFERRED EMBODIMENT(S)

The present invention now will be described more fully hereinafter with reference to the accompanying drawings, in which preferred embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Figure 1:
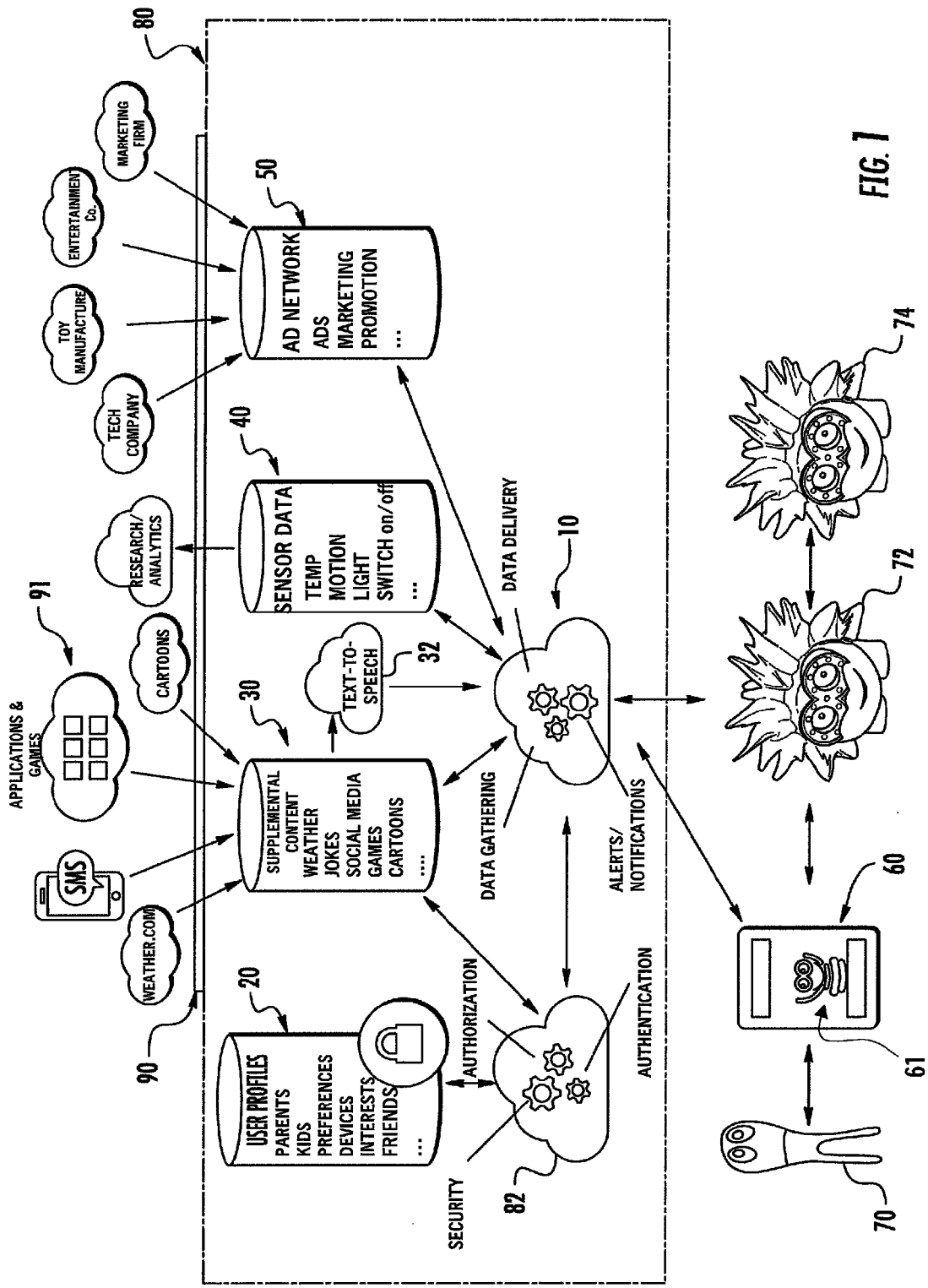
FIG. 1 is a diagram illustrating interaction of a communicator with a cloud database according to the present invention.

As shown in FIG. 1 the toy having a communicator 70 located therein connects to the cloud database 10 which corroborates and aggregates data across toys, smart devices, third party cloud services, and provides customized content to personalize the toy, or offer additional content to the child based on the child's user profile. For example, cloud database 10 utilizes location based content in order to correctly identify states like the weather and time of the associated communicator. Cloud database 10 addresses the children's interests based on the play patterns of the child with one or more communicators, information entered into a smart device application, or data queried from user profiles 20, the smart device itself (phones, tablets, computer and the like) 60, or other applicable user description entities in the cloud. The associated databases in the cloud 80 then uses this interest data to generate content applicable to the interests of the user and transmits that relevant content to one or more of the communicators 70, 72 and 74. These communicators may take the form of a toy such as the ones shown in FIG. 1 and FIG. 8 or a more conventional toy, such as a truck or a teddy bear, are used to house the communicator. For example, if the child is interested in cars, communicator 70 may push a relevant car joke from supplemental content portion 30 of the cloud database 10 and transmit it in speech form to the communicator 70 for the child. A timer hosted on the communicator, synched periodically with the smart device's 60 or cloud database's 10 time is also built into the communicator 70 to allow for a stopwatch, timer, and alarm function. The communicator 70 can use interest, location, and/or time based interactions in order to further entertain and inform the child.

Additionally, the cloud 80 has a third party application layer 90 that allows for outside individuals to write applications 91 that can connect with the cloud 80 and ultimately change the communicator 70 behavior. An application layer is an abstraction layer that specifies the shared protocols and interface methods used by hosts in a communication network. This ability allows for new communicator games, cloud database content to enable new behavior of the communicators, or create new communicator to communicator interaction that could reside for all communicators attached to a user profile 20 or just pre-selected communicators. For example, a third party application may be written to get communicator 70 to interact in a new way with communicator 72 and/or communicator 74 using the onboard sensors and effectors in a new way. Perhaps shaking communicator 70 would cause communicator 72 to laugh and communicator 74 to wag its tail. The third party application 91 can cause a smart device 60 to interact in a new way with communicator 72 and communicator 74. The smart device 60 includes a connection to the internet, and may include a screen display. It is envisioned that a child could select a cartoon to play on the smart device 60. The smart device 60 is linked to the cloud 80 and can alter the behavior of the communicator 72 associated with the user profile 20 such that if the cartoon character's laser fires in the cartoon, the laser of the communicator 72 will sound and flash too.

The user profile 20 stores the personally identifiable information for a user. A master profile is created by an adult guardian and then the guardian creates child profiles under the master profile. The adult having access to the master profile can view and control the child profiles created under it. They may use a smart device 60 to set this up. A master profile links master or child profiles with other master or child profiles to allow for secure friend linking and association within the user profile 20. In order for applications or toys to access data from within a profile, the user must be authenticated 82. The user profile 20 will continually update with data on a child, their development level, connected toys, connected devices, interests, skills, friends, and location, just to name a few. It is paramount that this information is secure and only accessed by the authorized applications, entities, and personnel. The authentication 82 will ensure only authorized users have access to the different data sets stored in the user profile 20.

Having a user profile 20 that stores data about a child and who their authorized friends and parents are, allows relevant and interest based content to be collected, derived, or stored and then used to influence, change, or customize a communicator's 70 response and behavior. Communicator 70 and smart device 60 have different sensors 160 (see FIG. 4), such as microphones, accelerometers, gyroscopes, magnetometer, geo-location, tilt, sound, temperature, lights, pressure, buttons, and the like. The communicators may also have different effectors 150 (see FIG. 4) like rotary or linear motors. The states of these sensors and effectors can be recorded in sensor data 40. By collecting the sensor state information over time, the data can then be accessible for developers to use in creating new applications 91 that use that sensor data. For example, a game developer may develop a new game for the smart device 60 that uses the sensor data 40 of a communicator 70 with a temperature sensor. When that communicator 70 is put in a cold environment like the freezer, the temperature data is transmitted directly to the smart device 60 or through the Internet to the smart device 60 hosting the game 61 and this environment changes the game 61 to an artic environment, unlocking the artic level. If the communicator 70 is put in the sun, the game 61 then moves it to a tropical environment.

Another portion of the cloud 80 is supplemental content 30 that receives data such weather, jokes, fun facts, social media, and the like. The data from supplemental content 30 may be sent to cloud database 10. The sensor data 40 can be utilized by others for research, to develop new learning algorithms about the child's development, or it could even be used for analytics for toy manufacturers and parents interested in how a child is using the associated toy with a communicator 72. This data can be used to inform new features for existing or follow-on toy lines. Using a motion sensor on the communicator 72, one may know when it is being played with. The motion data, stored in sensor data 40, could then be used to generate and analytics report to determine the communicator 70 to communicator 72 interaction time or communicator 72 total use time.

As analytics and data about children, their parents, and their friend network is gathered this data becomes highly valuable to toy manufacturers, content creators, and game developers to perform targeted advertising. How a toy is played with, what time of day it is, where the child is when playing, e.g., at soccer practice, at school, in the back of the car or elsewhere, and for how long during each play session can inform future providers of features for the communicator 70, games for play with the communicator 70 or cloud 80 content. If a child owns two communicators that are, for example, trucks (information stored in the user profile 20), and there is a new truck movie coming out to the theatres, this relevant content may be pushed from the ad network 50 to the master profile or if allowed by the master profile, the content may also be pushed to one or more child profiles. Who the ads are pushed to is determined based on cloud 80 information on the interests of the child. If the data can be pushed directly to the child, the child's associated communicator 70 (e.g., a truck) may even prompt to the child—"Do you have tickets to the new truck movie? Let me tell you how awesome the movie is going to be! Vroom vroom!"

The communicator 70 will be able to wirelessly upgrade as well, so new content that is designed after the original launch will be available to all who purchased the toy either by download or through purchase. This allows for product growth and allows for a faster release date because it can always be built upon.

Figure 2:
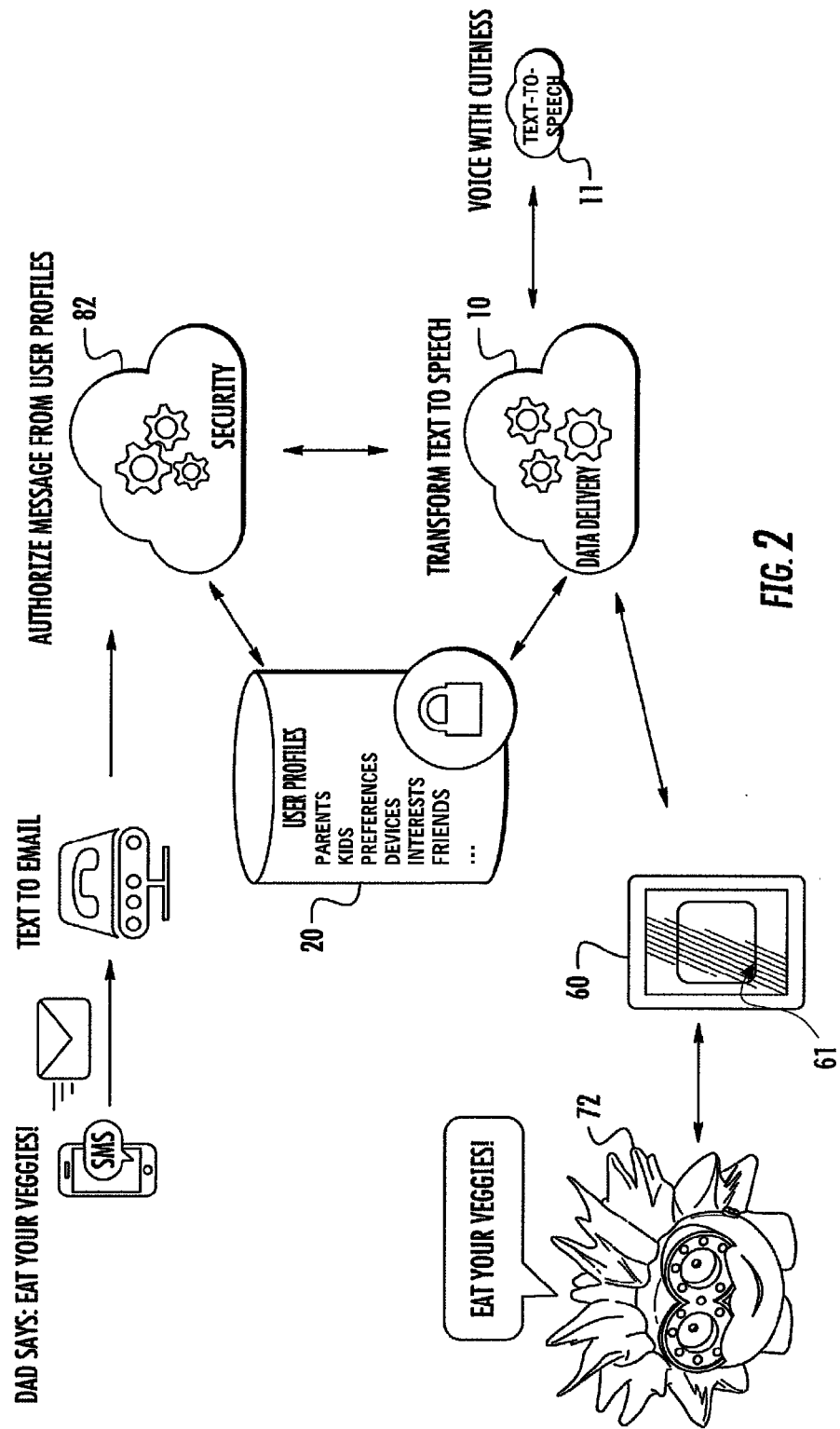
FIG. 2 is illustrates an example of one of the uses of the electronic interactive cloud-based toy of the present invention showing a path of text-to-speech communications.

A key feature of this invention is text-to-speech technology. To show how this feature works an example path for text-to-speech communications is shown in FIG. 2. A person will be able to send a message to a specific address in a variety of text formats and the data delivery 10 will relay the message via speech played through the speakers 78 (shown in FIG. 8) of communicator 72 or the smart device 60. The message can be sent through SMS text messaging or email, audio converted to text, and through content input or derived from the web-based application or the content generation algorithms through the security authentication 82 and the user profile 20 to the data delivery 10 and then transmits to the communicator 72 for play on demand.

The user or content based responses can be customized using a database of custom voices and languages hosted in the text-to-speech engine 11 of cloud 80. The text-to-speech engine allows for audio files to be generated in different voices with different genders, cartoon characters, and specific filters like pitch, bullhorn, echo, and the like. Alternatively, content to speech is a separate take on text-to-speech where content is generated not from the user or the user's family/friends via a message but from the cloud databased offerings and converted to audio in the text-to-speech engine 11. For example, if the child logs into the application 61 and types in their name as "Johnny," the cloud database 10 will generate a response that allows the associated communicator 70 or even just the character on the application 61 itself, to say "Hi Johnny." Based on the interests logged by the child over time and stored in the user profile 20, the cloud database 10 routes updates like sport scores, weather announcements, franchise/brand updates, and for example, "The new super hero movie is out! Let's go watch it!" The application 61 that will interface with the communicator 72 will have a set of parental control layers (authentication 82) for determining obvious privacy purposes. The parent will be able to set which devices will be able to communicate with the communicator 72 such as approved email addresses, phone numbers, and content that will be connecting to the communicator 72, as well as if marketing data from ad network 50 is allowed.

Figure 3:
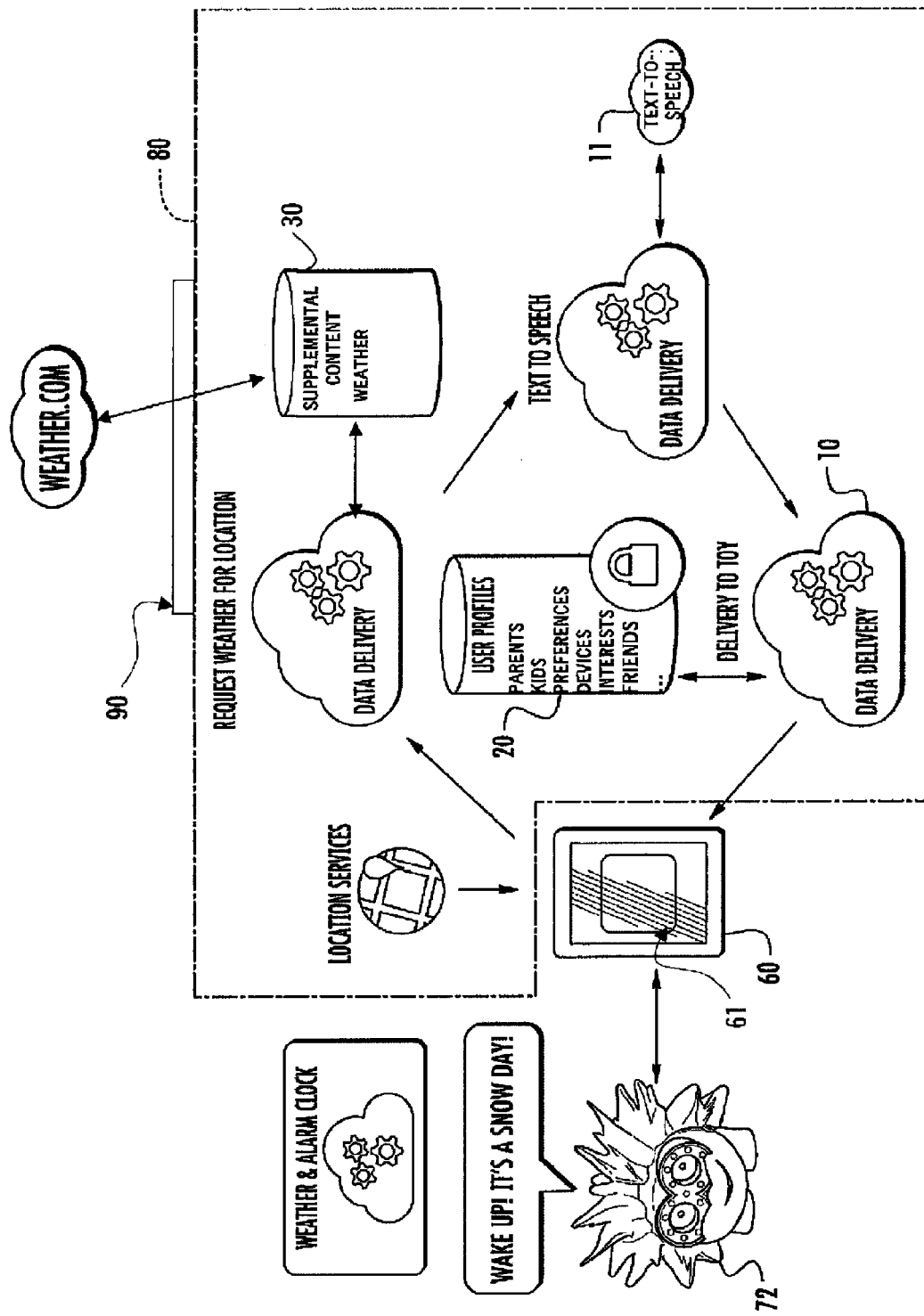
FIG. 3 is a diagram showing the programming of the electronic interactive cloud-based toy of the present invention to provide weather notices.

Another example of the usefulness of this invention is shown in FIG. 3, wherein the communicator 72 is programmed to generate customized responses based on the current weather. The cloud 80 may be programmed to communicate the weather to a user and provide customized alarms based on the weather. For example, a child may set an alarm for their communicator 72 to wake them at 6:00am if it is a snow day and if not a snow day, to wake them at 7:00am. They can customize the communicator for a snow day to wake them with yellow LED lights, and say "Wake up! It's a Snow Day!" The weather data is queried for the location of the communicator 72 which is pulled from the communicator 72 itself or the smart device 60 sensor. The weather data for that location is queried from cloud resources such as weather.com through the application layer 90. Based on the programs 61 on the smart device 60 or stored in the cloud 80, the communicator 72 can relay the weather by converting the specified weather statements ("Wake up! It's a Snow Day!") in the text-to-speech engine 11. The text-to-speech engine 11 will then deliver the audio and command data to data delivery 10 where it is routed to smart device 60 and then to communicator 72. If the communicator 72 had WiFi, the smart device 60 would not be needed and the communicator could receive the weather alarm statements directly.

There may be circumstances where the internet is not available. In the absence of an internet connection, the communicator 72 and/or the smart device 60 will have built-in programmed games. The child will be able to play classic games such as "Simon says" through the application 61 on the smart device 60 using the communicator 72 as input or output of the game. The games run through the application will connect to the communicator 72 via a Bluetooth device. There will also be games programmed into the communicator 72 that can be played without the application 61, so no wireless connection or smart device 60 with application 61 will be needed. An example would be an "ask" function, in which the child can ask a question and either by voice recognition or shaking of the communicator 72, the communicator 72 will provide an answer with pre-programmed content. The pre-programmed content can be updated when in range with the smart device 60 and/or connection to the cloud 80 so the next time the communicator 72 is offline, it has new content to pull from. The previously mentioned ability to download new content will also allow the communicator 72 to add new programmed games that, once downloaded, can be played without an internet connection, either using the application 61 or just through the toy.

Figure 4:
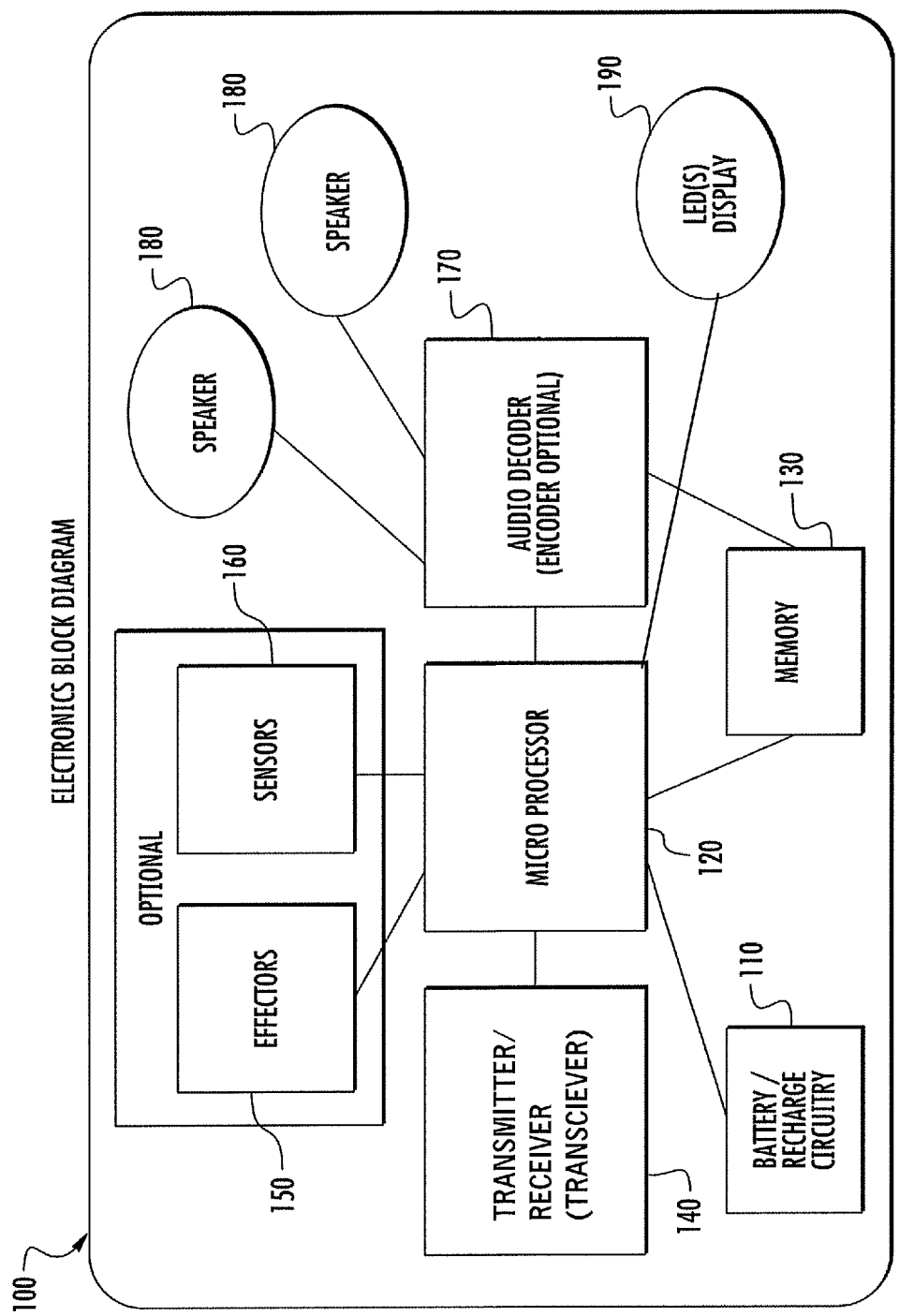
FIG. 4 is a block diagram showing the electronic circuitry of the present invention.

The electronic circuitry 100 of the communicator 72 used in the present invention is shown in FIG. 4. The electronic circuitry 100 includes a power supply. In the example shown in FIG. 4 the power supply 110 may be a battery with recharge circuitry. The power supply 110 powers a microprocessor 120 connected to a memory unit 130. The microprocessor 120 is also connected to a transmitter/receiver 140 also known as a transceiver. The transceiver 140 may be Bluetooth or instead of using a Bluetooth device a WiFi connection may be used, if desired. The electronic circuitry optionally but usually contains effectors 150 and sensors 160. The sensors 160 are a selectively populated group of sensors used to gather and monitor data and send the data to microprocessor 120. An example of a sensor from this group is a temperature sensor. Other sensors might include, sound, light, motion, and the like. The electronic circuitry also may include an audio decoder 170 having one or more speakers 180 connected thereto. Another option is to connect an LED display to the microprocessor 120.

Figure 5:
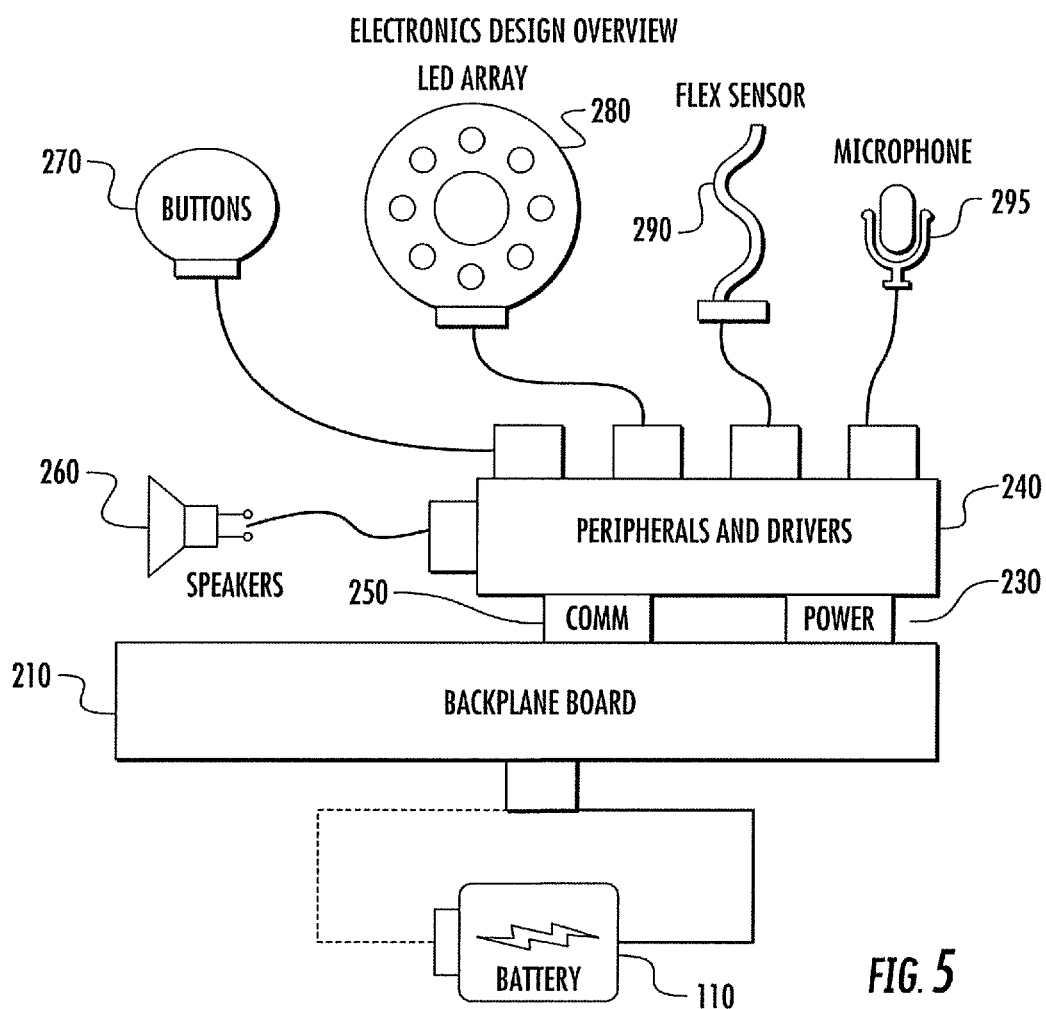
FIG. 5 is an overview of the electronic circuitry design for the communicators of the present invention.

FIG. 5 is a more detailed embodiment of the electronic circuitry 100. Battery 110 is connected to backplane board 210 or such other support as is well known in the art, such as a mother board or the like. A power connection 230 connects power from board 210 to peripheral and driver board 240 holding the peripherals and drivers. A communications connection 250 serves to communicate data from the peripherals and drives to the board 210. The peripherals and drives may include, for example, speakers 260, buttons 270, an LED array 280, a flex sensor 290 and a microphone 295.

Figure 6:
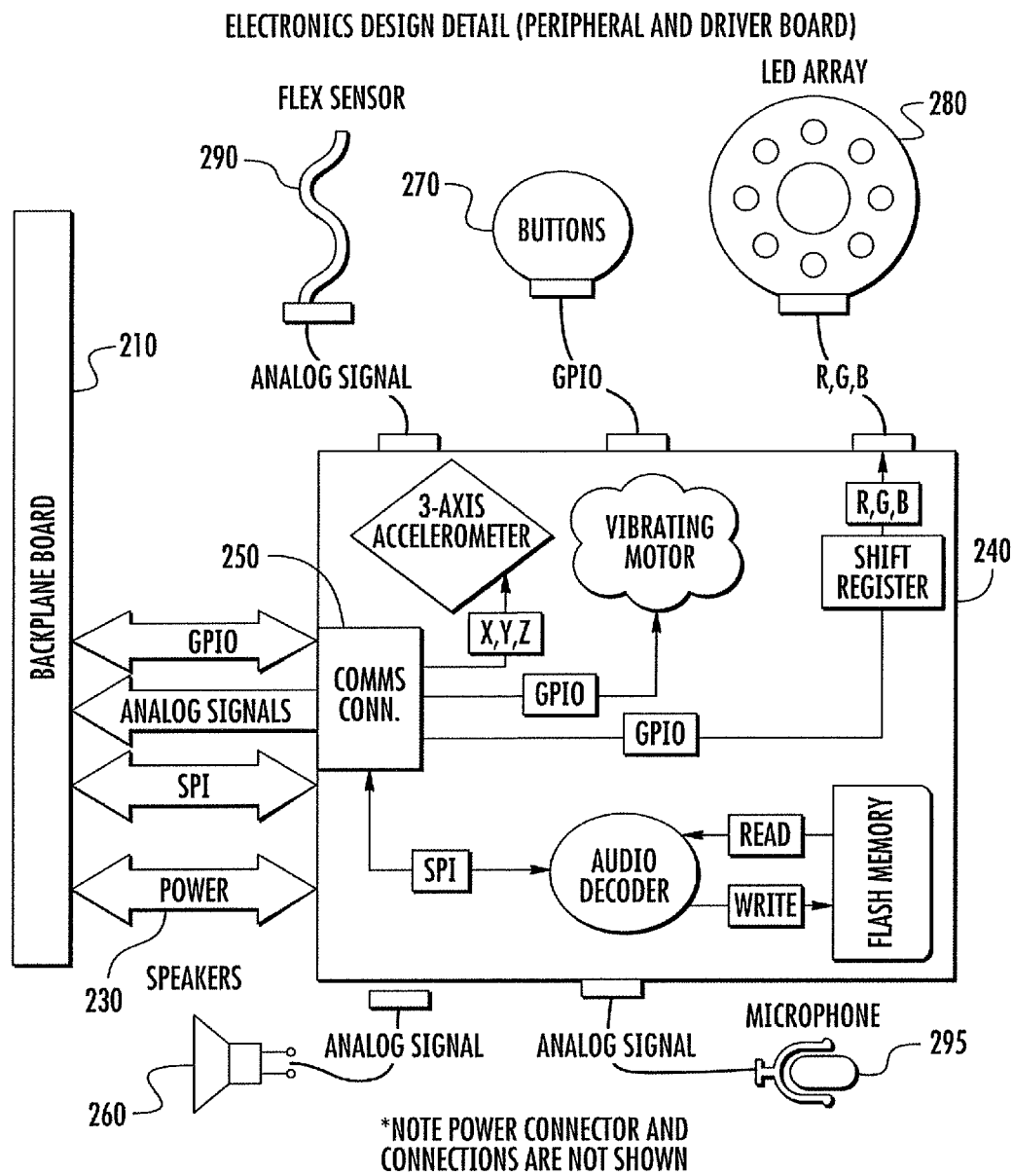
FIG. 6 is embodiment of the electronic circuitry of the peripheral and driver board shown in FIG. 5.

The electronic circuitry of the peripheral and driver board 240 is shown in FIG. 6, The backplane board 210 is connected to board 240 with connections that provide a power 230 and data connection 250. The board 240 includes all the board mounted sensors (flex, accelerometer, and others) and effectors (vibration motor and others), either surface mounted direct to the board or harnessed off of it. The peripherals and drives may include, for example, speakers 260, one or more buttons 270, an LED array 280, a flex sensor 290 and a microphone 295. The microphone 295 is connected to an audio decoder with read/write capability available from a flash memory.

Figure 7:
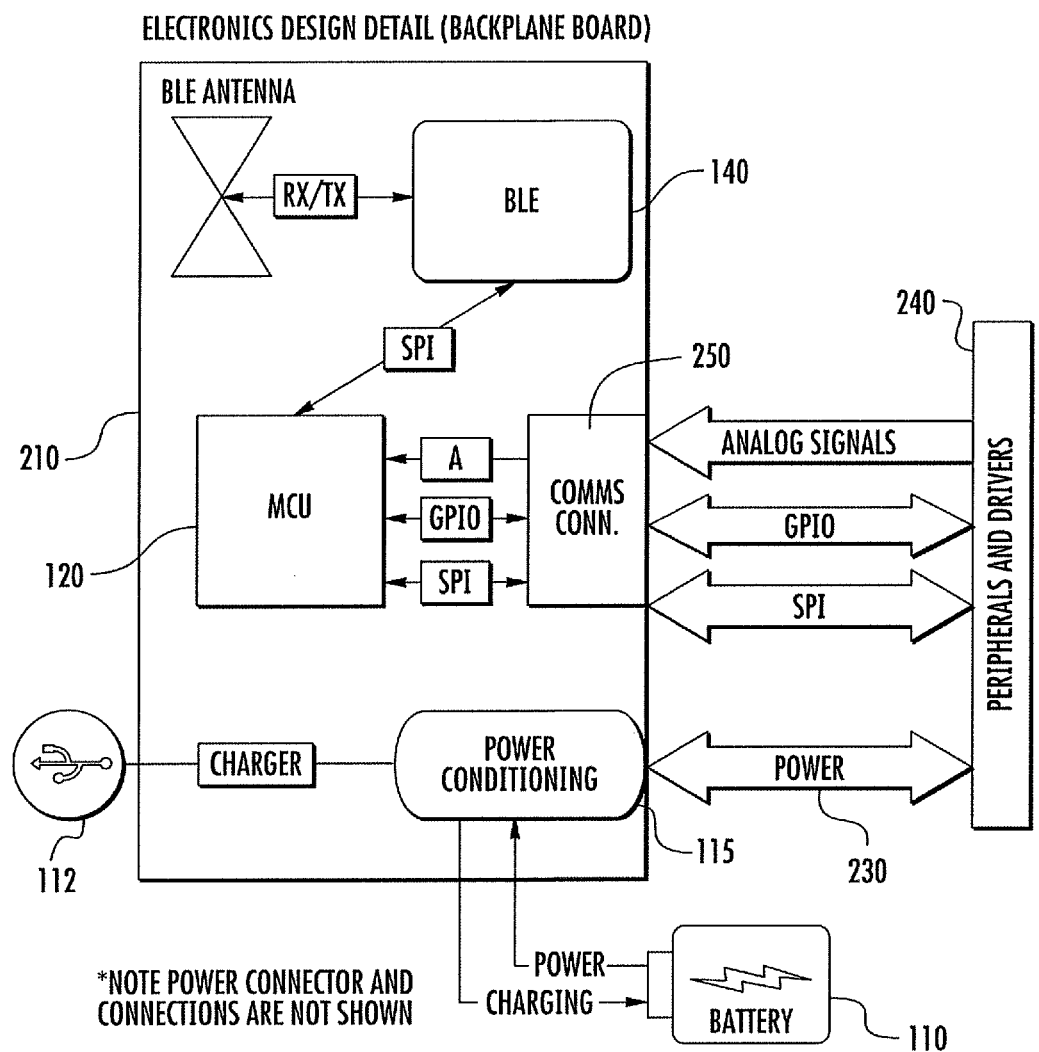
FIG. 7 is an embodiment of the electronic circuitry of the backplane board shown in FIG. 5.

The electronic design details of the backplane board 210 is shown in FIG. 7. The power supply, battery 110, is connected to power conditioner 115 and power is supplied to the peripherals and driver board 240 through connection 230. Power may also be supplied through charger 112. The power supply 110 powers the peripherals and drivers located on board 240. As data is obtained, the data is sent to the microprocessor 120 through communications ports 250. The microprocessor 120 is connected to a Bluetooth transceiver 140.

Figure 8:
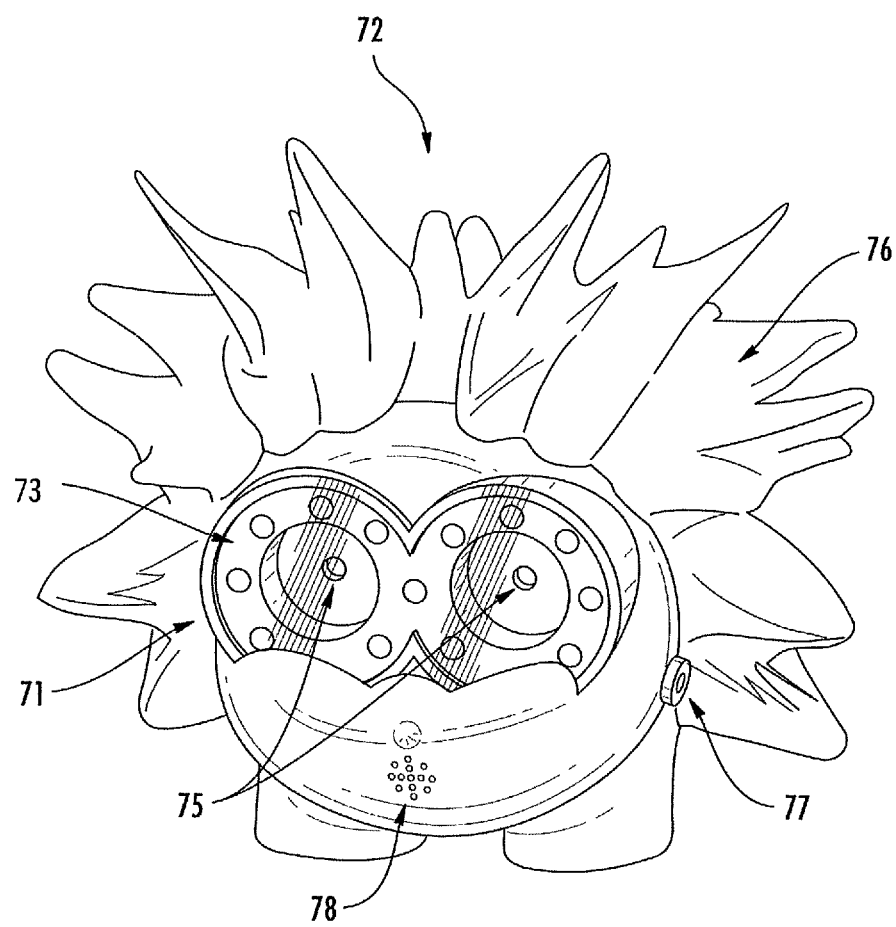
FIG. 8 is an example of an embodiment of a toy having a communicator housed within the toy.

The communicator may take many forms such as the communicator 70 or the communicator 72 shown in FIG. 1. The communicator may also be a bike, kite, or other device for kids that includes a communicator. One form of the communicator 72 is shown more specifically in FIG. 8. The communicator 72 has many child-friendly form factors. In FIG. 8 the communicator 72 is shown as having eyes 71 with centers 75. Outside of the centers 75 is a circular ring of LED lights 73 installed into the eyes 71 that are individually controlled to communicate emotions, thinking, and the like. The lights 73 can change colors and can light up in patterns. The eyes 71 can be interfaced with the different game and alarms modes that are programmed. In one embodiment the communicator 72 has silicon based hair 76 with a flex sensor, capacitive, or other type of touch sensor to determine petting, waving, compaction, or other hair interaction for use in personality behavior or game play. The communicator 72 has a button 77 to determine the play mode with the ability to switch between hosted games, such as Simon Says, Ask/Magic 8 Ball, and the like. A speaker 78 may be positioned in the communicator 72 to relay audio of many forms. Some of those audio files may be pre-generated audio stored on the communicator 72, on the smart device 60, or may come from the cloud 80. The communicator 72 can also have an end effector as a vibrating motor to create a force feedback response during game play or personality behavior (not shown). The communicator 72 is also powered/chargeable using a USB cable/connection. The communicator 72 may have other sensors to include accelerometers, light sensors, temp sensors, and the like to take local environmental readings to generate custom responses. The sensor data may be used at many levels to provide for customized play. It may be used locally on the communicator 72, transferred and used on the smart device 60, or transferred and used in the cloud 80, to generate interactive play experiences.

The housing for the communicator shown in FIG. 8 may be made of plastic, metal, or similar material and over-molded with a silicone-like material on the common body to seal the circuitry inside the housing. Over-molding provides a soft, durable body, and allows for custom colors and features for each modular design. The over-molded features can be changed for each base module design contemplated. The configuration of the housing of the base module may take a variety of shapes and sizes to form characters that are appealing to children. In another embodiment, the main body is vinyl and the hair is plush. Many forms and materials could be used for the present invention. Other embodiments of this invention include, for example, a vehicle or a push toy.

The communicator 70 has the ability to do speech-to-text as well as text-to-speech. So that would mean the audio chip on the communicator 70 can decode the audio file sent from the cloud and also encode speech received by the communicator's microphone from a child, encode that audio, and send it out to the cloud 80. As an example if the child says a phrase and the phrase is encoded on the communicator into an audio file which is sent out via the Bluetooth device to the smart device 60 or directly to the cloud 80 via WiFi. The data is then used by the cloud 80 where it may be routed to a friend. This case, the audio is sent via the cloud to the friend's smart device 60 where it is then sent to the authorized friend's communicator 70 where the message is played.

Also, there is the case that the communicator can sense the presence of other Bluetooth or WiFi radios and get content pushed to them, i.e., a child is walking past a toy store with a communicator inside, the Bluetooth radio in the store may cause the child's communicator to say —"come on inside some of your friends would like to play."

By downloading new applications 61 from the cloud 80 to the smart device 60 or the communicator 74 directly, the communicator 74 can play other games such as hide and seek, Hot and Cold and the like. This is because the Bluetooth devices can do ranging with other Bluetooth devices (one example: iBeacon implementation). So the communicator would know when it was near one of the authorized radios and can speak to it based on how it is configured.

Given the ability to update the onboard features of the communicator with content and programs, a single device can take on many personalities. Variations may include but are not limited to hair color, LED eye color, interests, voice type and accent (girl, boy, surfer, cowboy, pirate), laughter style (giggle, chuckle), personality (timid, adventurous, etc.). A randomly selected default set may be loaded on the toy at the factory but could be altered by the user through play with it, the application loaded on the smart device, or other inputs. With all the custom combinations and cloud based content changing based on interest, time, and location, no two devices would be exactly the same.

Many modifications and other embodiments of the invention set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims. Although specific terms are employed herein, they are used in a generic and descriptive senses only and not for the purposes of limitation.

What is claimed is:

1. An interactive toy system comprising:
a communicator in the form of a toy, the toy comprising a vehicle or figurine, having electronic circuitry located therein, said electronic circuitry including a microprocessor having memory capability and being operatively connected to a wireless transmitter/receiver for receiving commands therefrom and transmitting data thereto;
a cloud server operably connected to said communicator and being configured to dynamically control one or more functions of at least one child profile for a user of the communicator via authorization provisions for the user of the communicator, a security function, and a user profile, said user profile including at least one guardian profile and the at least one child profile such that the at least one guardian profile can view and control the at least one child profile, said authorization provisions being operable to enable said at least one guardian profile to selectively approve and restrict content accessible to said at least one child profile, and to selectively approve and restrict friend associations with said at least one child profile to establish one or more secure friend associations with said at least one child profile, said cloud server further comprising an application layer operably engaged with said user profile, said application layer being operable to define shared protocols between said cloud server and one or more third party applications to enable updating and altering the one or more functions of the communicator.

2. The interactive toy system according to claim 1 wherein said communicator further includes a smart device operatively connected to said cloud server.

3. The interactive toy system according to claim 1 wherein said authorization provisions are operable to enable said at least one guardian profile to selectively approve and customize content accessible to said at least one child profile.

4. The interactive toy system according to claim 1 wherein said electronic circuitry further includes an audio encoder and decoder.

5. The interactive toy system according to claim 1 wherein said electronic circuitry further includes at least one speaker.

6. The interactive toy system according to claim 1 wherein said electrical circuitry further includes an LED display.

7. The interactive toy system according to claim 1 wherein said electrical circuitry further includes an LCD display.

8. The interactive toy system according to claim 1 wherein said communicator includes one or more sensors from the group consisting of microphones, accelerometers, gyroscopes, magnetometer, flex, geo-location, tilt, sound, temperature, lights, pressure, and buttons.

9. The interactive toy system according to claim 1 wherein said communicator includes one or more actuators.

10. The interactive toy system according to claim 1 wherein messages are converted to audio in the text-to-speech engine and routed through a cloud data delivery network to said communicator.

11. The interactive toy system according to claim 1 wherein the wireless transceiver is a Bluetooth low energy radio.

12. The interactive toy system according to claim 1 wherein wireless transceiver is a WiFi radio.

13. The interactive toy system according to claim 1 wherein said user profile is configured to selectively filter one or more data sets accessible through the application layer according to said authorization provisions associated with said guardian profile, such that said application layer is operable to configure said shared protocols and interface methods to selectively restrict third party content.

14. The interactive toy system according to claim 1 wherein the cloud server includes a sensor database.

15. The interactive toy system according to claim 1 wherein said user profile is configured to selectively filter one or more data sets associated with said child profile from said application layer, such that said application layer is operable to configure said shared protocols to deliver customized content from said one or more third party applications to said communicator.

16. The interactive toy system according to claim 1 wherein the cloud server includes supplemental content.

17. An interactive toy system comprising:
a communicator in the form of a toy, the toy comprising a vehicle or figurine, having electronic circuitry located therein, said electronic circuitry includes a microprocessor and operatively connected to a wireless transceiver for receiving commands therefrom and transmitting data thereto; and,
a cloud server which corroborates and aggregates data, said cloud server being configured to dynamically control one or more functions of at least one child profile for a user of said communicator via authorization provisions for the user of the communicator, a security function, and a user profile, said user profile including at least one guardian profile and the at least one child profile such that the at least one guardian profile can view and control the at least one child profile, said authorization provisions operable to enable said at least one guardian profile to selectively approve and restrict content accessible to said at least one child profile, and to selectively approve and restrict friend associations with said at least one child profile to establish one or more secure friend associations with said at least one child profile;
said cloud server further comprising an application layer executing on said cloud server and operably engaged with said user profile, said application layer being operable to define shared protocols and interface methods between said cloud server and one or more third party applications, said user profile being configured to selectively filter one or more data sets from said application layer according to authorization provisions associated with said guardian profile, such that said abstraction application layer is operable to selectively restrict third party content and deliver customized content from said one or more third party applications to said communicator.

* * * * *